United States Patent
Falco et al.

(10) Patent No.: US 9,787,561 B2
(45) Date of Patent: Oct. 10, 2017

(54) SYSTEM AND METHOD FOR SUPPORTING A SELECTION SERVICE IN A SERVER ENVIRONMENT

(71) Applicant: Oracle International Corporation, Redwood Shores, CA (US)

(72) Inventors: Mark Falco, Burlington, MA (US); Ballav Bihani, Fremont, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 123 days.

(21) Appl. No.: 13/671,433

(22) Filed: Nov. 7, 2012

(65) Prior Publication Data

US 2014/0108645 A1    Apr. 17, 2014

Related U.S. Application Data

(60) Provisional application No. 61/714,100, filed on Oct. 15, 2012.

(51) Int. Cl.

| | |
|---|---|
| *G06F 15/173* | (2006.01) |
| *H04L 12/26* | (2006.01) |
| *G06F 17/30* | (2006.01) |
| *H04L 29/08* | (2006.01) |
| *G06F 11/16* | (2006.01) |
| *G06F 11/20* | (2006.01) |
| *H04L 12/24* | (2006.01) |

(52) U.S. Cl.
CPC .......... *H04L 43/0811* (2013.01); *G06F 11/16* (2013.01); *G06F 11/2041* (2013.01); *G06F 11/2097* (2013.01); *G06F 17/30067* (2013.01); *G06F 17/30371* (2013.01); *H04L 67/1095* (2013.01); *G06F 11/2048* (2013.01); *G06F 2201/82* (2013.01); *H04L 41/0668* (2013.01)

(58) Field of Classification Search
USPC ....... 709/206, 223, 224, 227; 726/1, 4, 8, 23
See application file for complete search history.

(56) References Cited

U.S. PATENT DOCUMENTS

| | | |
|---|---|---|
| 5,014,265 A | 5/1991 | Hahne et al. |
| 5,301,350 A | 4/1994 | Rogan et al. |
| 5,561,785 A | 10/1996 | Blandy |
| 5,784,698 A | 7/1998 | Brady et al. |
| 6,070,202 A | 5/2000 | Minkoff et al. |

(Continued)

OTHER PUBLICATIONS

Andrew S. Tanenbaum, Computer Networks: Fourth Edition, Prentice Hall PTR. (2003).*

(Continued)

*Primary Examiner* — Liangche A Wang
(74) *Attorney, Agent, or Firm* — Tucker Ellis LLP

(57) ABSTRACT

A system and method can support socket programming in a server environment, such as a distributed data grid. The server environment can include a selection service that operates to register a plurality of sockets, wherein each socket is associated with a handler in a plurality of handlers. Furthermore, the selection service can listen for one or more incoming connection requests on the plurality of sockets, and invoke a pluggable callback provided by a handler associated with a registered socket in the plurality of sockets, when registered socket receives an incoming connection request.

20 Claims, 4 Drawing Sheets

(56) References Cited

U.S. PATENT DOCUMENTS

| | | | |
|---|---|---|---|
| 6,338,112 B1 | 1/2002 | Wipfel et al. | |
| 6,826,597 B1 | 11/2004 | Lonnroth et al. | |
| 7,058,055 B2 | 6/2006 | Mugica | |
| 7,139,925 B2 | 11/2006 | Dinker | |
| 7,707,513 B2* | 4/2010 | Broda et al. | 715/804 |
| 7,861,249 B2 | 12/2010 | Jiang | |
| 7,904,493 B2 | 3/2011 | Schmelter | |
| 7,936,753 B1 | 5/2011 | Colloff | |
| 8,024,445 B2* | 9/2011 | Kamijima et al. | 709/223 |
| 8,122,006 B2* | 2/2012 | de Castro Alves et al. | 707/713 |
| 8,131,894 B2 | 3/2012 | Cain et al. | |
| 8,166,095 B2* | 4/2012 | Ferwerda et al. | 709/201 |
| 8,249,072 B2 | 8/2012 | Sugumar | |
| 8,259,571 B1 | 9/2012 | Raphel | |
| 8,271,980 B2 | 9/2012 | Jackson | |
| 8,290,919 B1 | 10/2012 | Kelly | |
| 8,332,493 B2* | 12/2012 | Rowley et al. | 709/220 |
| 8,392,368 B1 | 3/2013 | Kelly | |
| 8,447,793 B2 | 5/2013 | Burka | |
| 8,510,376 B2* | 8/2013 | Kaczmarski et al. | 709/203 |
| 8,539,192 B2* | 9/2013 | Castillo et al. | 711/170 |
| 8,612,386 B2 | 12/2013 | Tien | |
| 8,621,031 B2* | 12/2013 | Desai | 709/217 |
| 8,687,636 B1 | 4/2014 | Sivan | |
| 8,768,981 B1 | 7/2014 | Milne | |
| 2002/0023173 A1* | 2/2002 | Jacobs | G06F 9/465 709/245 |
| 2002/0196782 A1 | 12/2002 | Furukawa | |
| 2004/0010674 A1* | 1/2004 | Boyd et al. | 711/170 |
| 2004/0083317 A1 | 4/2004 | Dickson et al. | |
| 2004/0172618 A1 | 9/2004 | Marvin | |
| 2005/0249215 A1 | 11/2005 | Kelsey | |
| 2006/0026169 A1* | 2/2006 | Pasqua | 707/10 |
| 2006/0112174 A1 | 5/2006 | L'Heureux et al. | |
| 2006/0129516 A1 | 6/2006 | Bradford et al. | |
| 2006/0161893 A1* | 7/2006 | Han et al. | 717/120 |
| 2006/0230128 A1* | 10/2006 | Chung et al. | 709/223 |
| 2007/0168336 A1 | 7/2007 | Ransil et al. | |
| 2007/0230477 A1 | 10/2007 | Worley | |
| 2008/0208960 A1* | 8/2008 | Rowley et al. | 709/203 |
| 2008/0320501 A1* | 12/2008 | Li | G06F 9/45537 719/324 |
| 2009/0077233 A1* | 3/2009 | Kurebayashi et al. | 709/224 |
| 2009/0116484 A1 | 5/2009 | Buford | |
| 2009/0177914 A1 | 7/2009 | Winchell | |
| 2009/0219820 A1 | 9/2009 | Acke | |
| 2009/0234897 A1 | 9/2009 | Qi | |
| 2010/0005472 A1 | 1/2010 | Krishnaraj et al. | |
| 2010/0011414 A1 | 1/2010 | Banerjee | |
| 2010/0017461 A1 | 1/2010 | Kokkevis et al. | |
| 2010/0037222 A1* | 2/2010 | Tatsubori et al. | 718/100 |
| 2010/0042755 A1 | 2/2010 | Fuente | |
| 2010/0060934 A1 | 3/2010 | Bellert | |
| 2010/0093441 A1 | 4/2010 | Rajaraman | |
| 2010/0125624 A1* | 5/2010 | Bachhuber-Haller et al. | 709/202 |
| 2010/0265945 A1 | 10/2010 | Bejerano | |
| 2010/0287216 A1 | 11/2010 | Ylonen | |
| 2010/0333099 A1 | 12/2010 | Kupferschmidt | |
| 2011/0004701 A1* | 1/2011 | Panda et al. | 709/242 |
| 2011/0055322 A1* | 3/2011 | Gregersen | 709/203 |
| 2011/0137991 A1* | 6/2011 | Russell | 709/204 |
| 2011/0225120 A1 | 9/2011 | Cooper | |
| 2011/0225121 A1 | 9/2011 | Cooper | |
| 2011/0225122 A1 | 9/2011 | Denuit et al. | |
| 2011/0246550 A1* | 10/2011 | Levari et al. | 709/201 |
| 2011/0296052 A1 | 12/2011 | Guo | |
| 2012/0084409 A1* | 4/2012 | Rowley et al. | 709/220 |
| 2012/0113896 A1 | 5/2012 | Karol | |
| 2012/0144025 A1* | 6/2012 | Melander et al. | 709/224 |
| 2012/0197840 A1 | 8/2012 | Oliver et al. | |
| 2012/0197959 A1 | 8/2012 | Oliver et al. | |
| 2012/0198455 A1 | 8/2012 | Lee et al. | |
| 2012/0278398 A1 | 11/2012 | Lowekamp | |
| 2012/0331029 A1 | 12/2012 | King, III et al. | |
| 2013/0014114 A1 | 1/2013 | Nagata | |
| 2013/0041969 A1* | 2/2013 | Falco et al. | 709/212 |
| 2013/0073809 A1 | 3/2013 | Antani et al. | |
| 2013/0074101 A1 | 3/2013 | Oliver | |
| 2013/0103837 A1* | 4/2013 | Krueger | 709/226 |
| 2013/0128726 A1 | 5/2013 | Hellhake | |
| 2013/0262632 A1 | 10/2013 | Fein | |
| 2013/0325543 A1 | 12/2013 | Magee | |
| 2014/0016457 A1 | 1/2014 | Enyedi | |
| 2014/0108516 A1* | 4/2014 | Ekeroth | G06F 11/1658 709/203 |
| 2014/0219209 A1 | 8/2014 | Soneda | |

OTHER PUBLICATIONS

Class SocketChannel, Java 2 Platform, Oracle Int'l. Corp. (2004) http://docs.oracle.com/javase/1.5.0/docs/api/java/nio/channels/SocketChannel.html.*

Martin Sustrik, [zeromq-dev] Subports, Grokbase. (Jul. 27, 2011) http://grokbase.com/t/zeromq/zeromq-dev/117vwvr6z9/subports.*

Tanenbaum, Andrew S., *Modern operating systems* Prentice-Hall, Inc., Upper Saddle River, New Jersey, 2001. 5 pages.

Tanenbaum, Computer Network, 4th Ed., Chapter 5, 5.2.7 Broadcast Routing, 2003, p. 368, Prentice Hall PTR, Saddle River, US.

D. Johnson et al., Network Working Group, RFC 4728; "The Dynamic Source Routing Protocol (DSR) for Mobile Ad HOC Networks for IPv4", Microsoft Research Feb. 2007, 107 Pages.

* cited by examiner

SYSTEM AND METHOD FOR SUPPORTING A SELECTION SERVICE IN A SERVER ENVIRONMENT

CLAIM OF PRIORITY

This application claims priority on U.S. Provisional Patent Application No. 61/714,100, entitled "SYSTEM AND METHOD FOR SUPPORTING A DISTRIBUTED DATA GRID IN A MIDDLEWARE ENVIRONMENT," by inventors Robert H. Lee, Gene Gleyzer, Charlie Helin, Mark Falco, Ballav Bihani and Jason Howes, filed Oct. 15, 2012, which application is herein incorporated by reference.

CROSS-REFERENCED APPLICATIONS

The current application hereby incorporates by reference the material in the following patent applications:

U.S. patent application Ser. No. 13/671,420, entitled "SYSTEM AND METHOD FOR SUPPORTING PORT MULTIPLEXING IN A SERVER ENVIRONMENT", by inventors Mark Falco and Ballav Bihani, filed Nov. 7, 2012.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems, and is particularly related to supporting a server environment.

BACKGROUND

Modern computing systems, particularly those employed by larger organizations and enterprises, continue to increase in size and complexity. Particularly, in areas such as Internet applications, there is an expectation that millions of users should be able to simultaneously access that application, which effectively leads to an exponential increase in the amount of content generated and consumed by users, and transactions involving that content. Such activity also results in a corresponding increase in the number of transaction calls to databases and metadata stores, which have a limited capacity to accommodate that demand.

This is the general area that embodiments of the invention are intended to address.

SUMMARY

Described herein are systems and methods that can support socket programming in a server environment, such as a distributed data grid. The server environment can include a selection service that operates to register a plurality of sockets, wherein each said socket is associated with a handler in a plurality of handlers. Furthermore, the selection service can listen for one or more incoming connection requests on the plurality of sockets, and invoke a pluggable callback provided by a said handler associated with a registered socket in the plurality of sockets, when said registered socket receives an incoming connection request.

DETAILED DESCRIPTION

Figure 1:
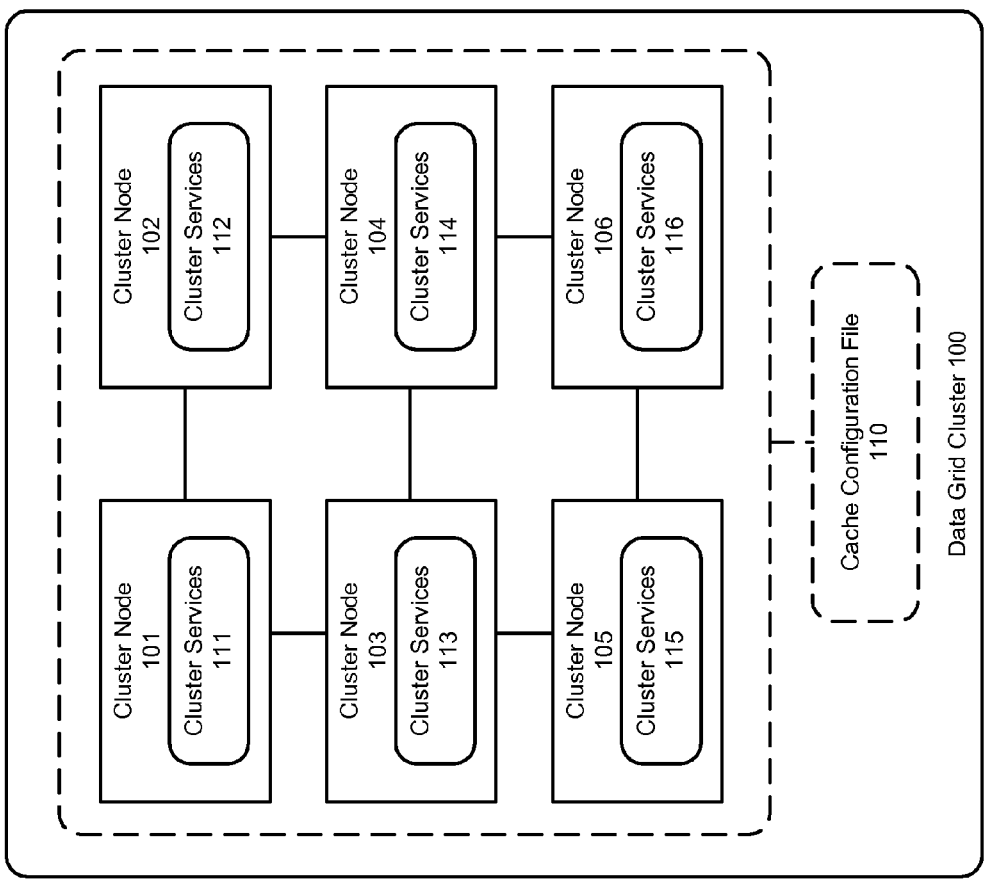
FIG. 1 is an illustration of a data grid cluster in accordance with various embodiments of the invention.

Described herein are systems and methods that can support socket programming in a server environment, such as a distributed data grid.

In accordance with an embodiment, as referred to herein a "distributed data grid", "data grid cluster", or "data grid", is a system comprising a plurality of computer servers which work together to manage information and related operations, such as computations, within a distributed or clustered environment. The data grid cluster can be used to manage application objects and data that are shared across the servers. Preferably, a data grid cluster should have low response time, high throughput, predictable scalability, continuous availability and information reliability. As a result of these capabilities, data grid clusters are well suited for use in computational intensive, stateful middle-tier applications. Some examples of data grid clusters, e.g., the Oracle Coherence data grid cluster, can store the information in-memory to achieve higher performance, and can employ redundancy in keeping copies of that information synchronized across multiple servers, thus ensuring resiliency of the system and the availability of the data in the event of server failure. For example, Coherence provides replicated and distributed (partitioned) data management and caching services on top of a reliable, highly scalable peer-to-peer clustering protocol.

An in-memory data grid can provide the data storage and management capabilities by distributing data over a number of servers working together. The data grid can be middleware that runs in the same tier as an application server or within an application server. It can provide management and processing of data and can also push the processing to where the data is located in the grid. In addition, the in-memory data grid can eliminate single points of failure by automatically and transparently failing over and redistributing its clustered data management services when a server becomes inoperative or is disconnected from the network. When a new server is added, or when a failed server is restarted, it can automatically join the cluster and services can be failed back over to it, transparently redistributing the cluster load. The data grid can also include network-level fault tolerance features and transparent soft re-start capability In accordance with an embodiment, the functionality of a data grid cluster is based on using different cluster services. The cluster services can include root cluster services, partitioned cache services, and proxy services. Within the data grid cluster, each cluster node can participate in a number of cluster services, both in terms of providing and consuming the cluster services. Each cluster service has a service name that uniquely identifies the service within the data grid cluster, and a service type, which defines what the cluster service can do. Other than the root cluster service running on each cluster node in the data grid cluster, there may be multiple named instances of each service type. The services can be either configured by the user, or provided by the data grid cluster as a default set of services.

FIG. 1 is an illustration of a data grid cluster in accordance with various embodiments of the invention. As shown in FIG. 1, a data grid cluster 100 includes a plurality of cluster nodes 101-106 having various cluster services 111-116 running thereon. Additionally, a cache configuration file 110 can be used to configure the data grid cluster 100.

Asynchronized Message Processing

In accordance with various embodiments of the invention, the distributed data grid can support asynchronized message processing based on the using of both a continuation data structure and a message processing pattern. The continuation data structure can represent the control state of a computational process at a given point in execution and can allow the computational process to resume execution at a later point in time on another thread. Furthermore, the message processing pattern can be used to forward a received message to a subscriber for processing, based on a message queue in the distributed data grid.

Figure 1A:
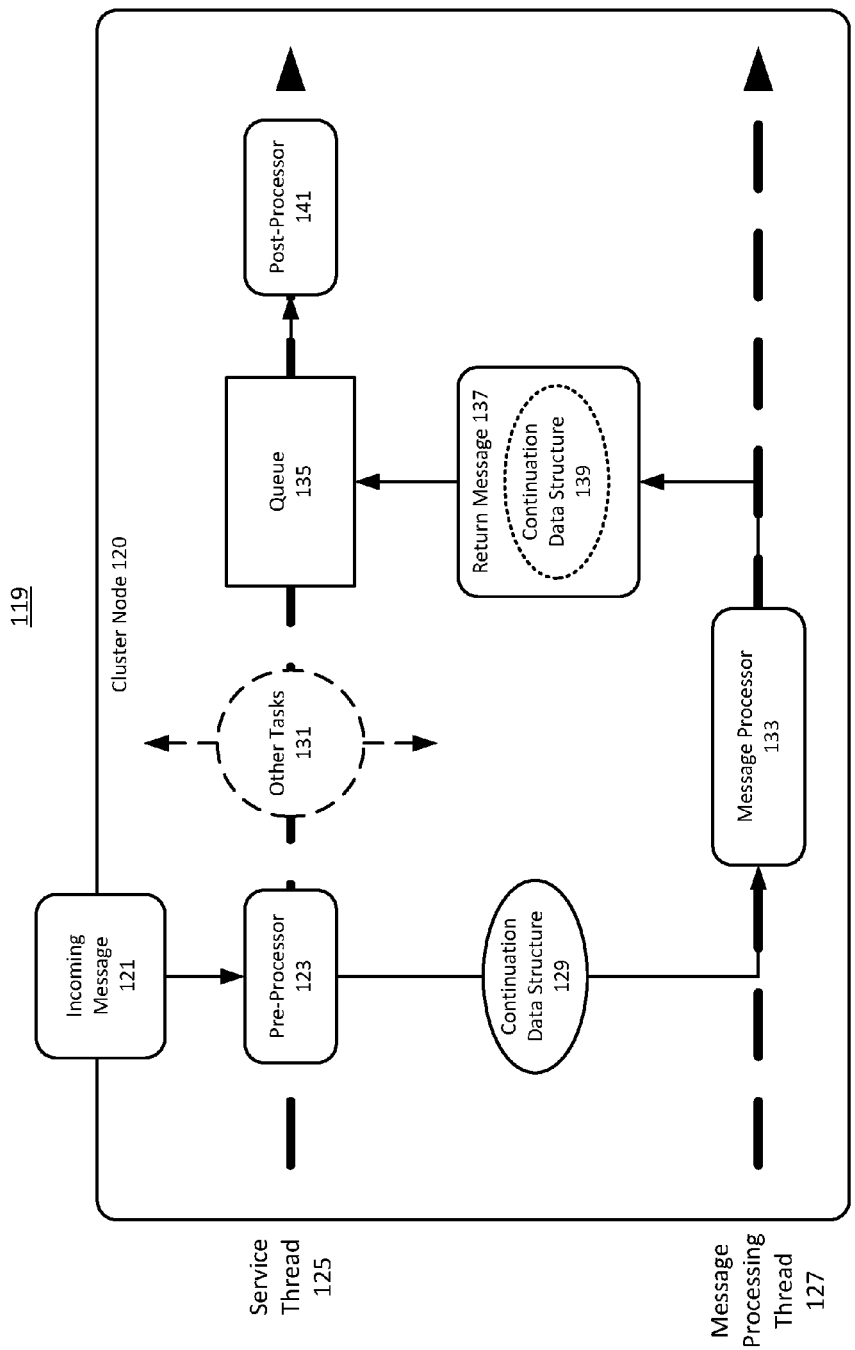
FIG. 1A is an illustration of supporting asynchronized message processing in a distributed data grid in accordance with various embodiments of the invention.

FIG. 1A is an illustration of supporting asynchronized message processing in a distributed data grid in accordance with various embodiments of the invention. As shown in FIG. 1A, a cluster node 120 in a distributed data grid 119 can receive an incoming message 121 from an outside client or another cluster node. The processing of the incoming message 121 can trigger various actions or operations in the distributed data grid 119, such as a reading or writing operation on the distributed data grid 119.

A service thread 125 on the cluster node 120, e.g. a cluster service thread or a partition cache thread, can be responsible for handling the received incoming message 121. Since the service thread 125 can be a thread on the cluster node 120 that facilitates various other data grid operations, performing message processing on the service thread 125 can become a bottleneck that may affect the performance of the distributed data grid 119. Thus, it may be preferable to dispatch the processing of the incoming message 121 to other threads on the cluster node 120.

In accordance with various embodiments of the invention, an asynchronized message processing scheme can include three stages: a pre-processing stage, an asynchronized message processing stage, and a post-processing stage. While the pre-processing stage and the post-processing stage can be performed on the service thread 125, the asynchronized message processing stage can be performed on another thread, e.g. a message processing thread 127, in order to alleviate the bottleneck on the service thread 125.

As shown in FIG. 1A, the cluster node 120 can use a pre-processor 123 on the service thread 125 to process the incoming message 121. Then, the cluster node 120 can dispatch the processing of the received incoming message 121 from the service thread 125 to the message processing thread 127.

The pre-processor 123 on the service thread 125 can send a continuation data structure 129 to a message processor 133 on the message processing thread 127 along with the request. The continuation data structure 129 can represent the control state for processing the incoming message 121 on the service thread 123. Thus, the continuation data structure 129 can store attributes for continuing the processing of the incoming message 121 on the message processing thread 127.

After the message processor 133 on the message processing thread 127 finishes processing the incoming message, the message processing thread 127 can wrap a continuation data structure 139 in a return message 137, and send the return message 137 to a service queue 135 associated with the service thread 125. The continuation data structure 139 in the return message 137 can be created by the message processor 133 on the message processing thread 127, based on the continuation data structure 129 that was received from the service thread 123.

Then, a post-processor 141 on the service thread 125 can pick up the return message 137 from the service queue 135 and process the return message 137 accordingly, e.g. based on the message processing pattern supported in the distributed data grid 119. The outcome of processing the return message 137 on the service thread 125 is that the service thread 125 can perform post-processing of the incoming message 121 based on the continuation data structure 139 wrapped in the return message 137.

Unlike the traditional continuation programming scheme, the asynchronized message processing scheme ensures that the post-processing of the incoming message 121 always returns to the originating service thread 123, instead of on a random thread. Also, using the asynchronized message processing scheme, the service thread 123 is not blocked and can perform other tasks 131, while the message processing thread 123 is processing the incoming message 121.

Selection Services

Figure 2:
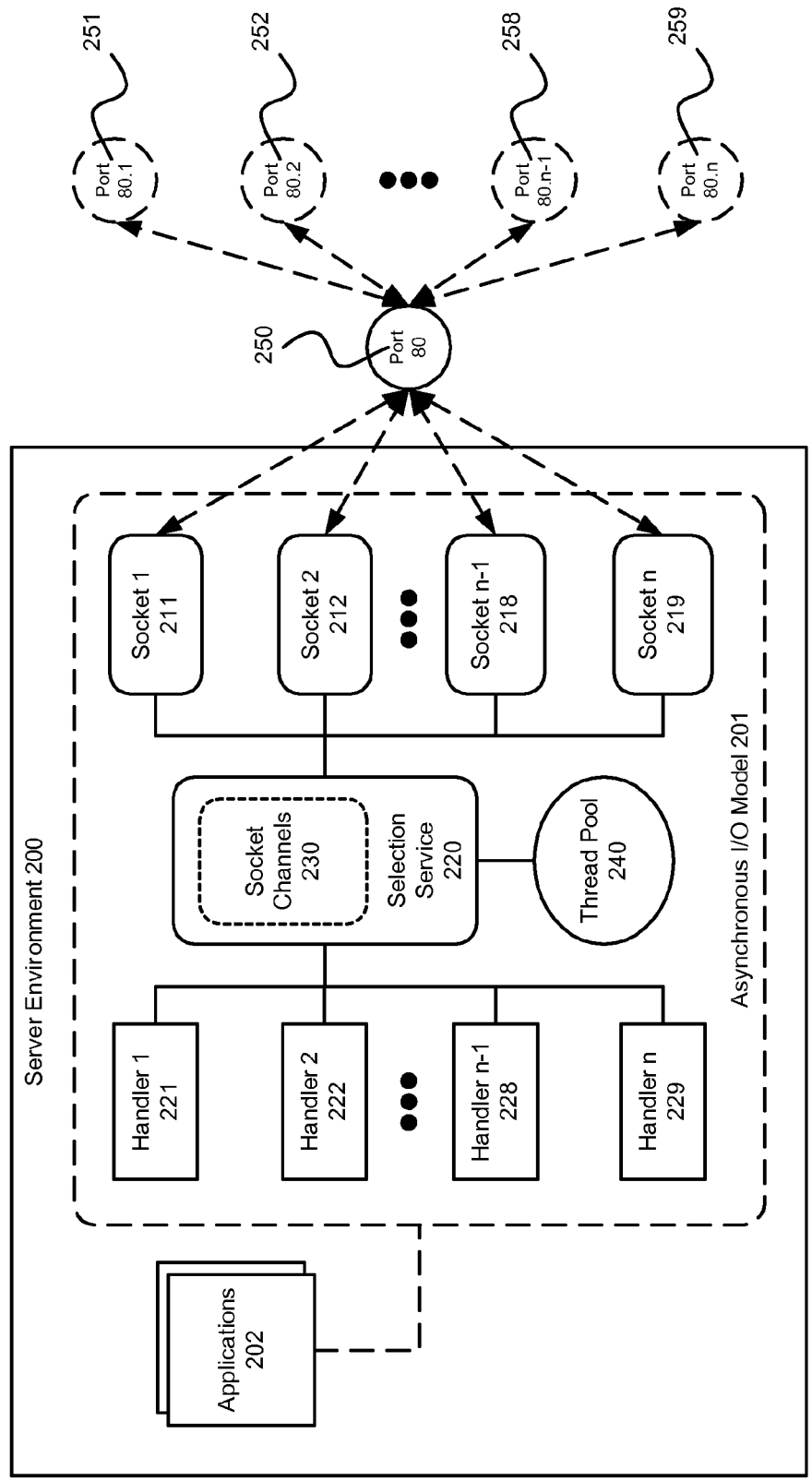
FIG. 2 shows an illustration of providing selection services for socket programming in a server environment, in accordance with an embodiment of the invention.

FIG. 2 shows an illustration of providing selection services for socket programming in a server environment, in accordance with an embodiment of the invention. As shown in FIG. 2, a server environment 200, e.g. a Coherence distributed data grid, can support an asynchronous I/O model 201, which can be shared by one or more applications 202.

The asynchronous I/O model 201 can use a plurality of server sockets 211-219, e.g. sockets 1 to N, in order to perform read and/or write operations for the one or more applications 202. A server socket 211-219 can wait for requests coming over the network at a physical port 250. Then, the server socket 211-219 can perform the read and/or write operations based on the request.

Furthermore, the server environment 200 can provide a plurality of handlers 221-229, e.g. handlers 1 to N, for handling incoming network streams at each of the plurality of sockets 211-219 respectively.

The asynchronous I/O model 201 can include a selection service 220, which maintains one or more socket channels 230. A server socket channel 230 can be created unbounded, and a server socket channel can be bound with an associated server socket 211-219 by invoking one of the bind methods of the associated server socket 211-219.

The server environment 200 can register the plurality of server sockets 211-219 and the corresponding handlers 221-229 with the selection service 220, e.g. by associating a server socket 211-219 with a server socket channel 230 maintained by the selection service 220.

Each handler 221-229 can provide a pluggable callback to the selection service 220 at the time of registration. At the time when a registered server socket channel 230 needs servicing an incoming connection request, the selection service 202 can invoke a callback to a corresponding handler in the plurality of handlers 221-229.

In accordance with an embodiment of the invention, a selection service 220 can implement an interface, e.g. a SelectionService interface in Coherence, which describes a service for selecting on different channels. For example, the SelectionService interface can provide a register function, as in the following.

```
void register(java.nio.channels.SelectableChannel chan,
    SelectionService.Handler handler)
    throws java.io.IOException
```

The register function can register a channel, e.g. chan, with the selection service 220 for monitoring and can provide the selection service 220 with a handler, e.g. handler, for callback when the channel is ready for servicing with the service. If the handler is called for the same channel for multiple times, the prior handler may be unregistered and the new handler can be registered in its place. The handler can be deregistered either by closing the channel or via an explicit reregistration with a null handler. Following a (re)registration, the handler can have an initial interest set based on the channels full valid operation set.

Additionally, the SelectionService interface can provide a invoke function, as in the following.

```
void invoke(java.nio.channels.SelectableChannel chan,
    java.lang.Runnable runnable,
    long cMillis)
    throws java.io.IOException
```

The SelectionService can invoke a runnable object, e.g. runnable, via the invoke function. The invoke function can guarantee that the runnable object associated with the SelectableChannel, e.g. chan, and any handler associated with the same channel do not run concurrently. Additionally, if the invoke function is called for the same channel for multiple times, the runnable objects can be executed sequentially in the order the invoke function is called.

Additionally, the server environment 200 can deregister a socket 211-219 from the selection service 220.

Furthermore, the asynchronous I/O model 201 can utilize a thread pool 240 provided by server environment 200 for handling the plurality of sockets 211-219. The server environment can decide how many threads can be used in the thread pool 240, and there is no need for the applications 202 to implement application logics for handling multiple threads. Thus, the asynchronous I/O model 201 can be easily scalable in terms of using a large number of threads for performing read and/or write operations. For example, using the asynchronous I/O model 201, the same application 202 can be deployed on a distributed data grid with a large number of processing threads, or on a single server machine with a single I/O thread.

In accordance with an embodiment of the invention, the selection service 220 can support multiplexing the single physical port 250 e.g., a physical port 80, into multiple sub-ports 251-259, e.g. port 80.1 to port 80.n.

In order to support using multiplexed sockets 211-219 based on the multiplexed multiple sub-ports 251-259, the selection services 220 can maintain a plurality of multiplexed server socket channels 230, e.g. MultiplexedServerSocketChannel, which is an implementation of a ServerSocketChannel that shares an underlying ServerSocketChannel with a number of other MultiplexedServerSocketChannels.

The selection service 220 can open one or more server socket channels 230 for the plurality of multiplexed sockets 211-219, and bind a specific sub-port address 251-259 on a single physical port 250 with each multiplexed socket 211-219, which is registered with a server socket channel, before an incoming connection can be accepted. Then, the selection service 220 can invoke a callback to a corresponding handlers 221-228 for handling the incoming network stream. Thus, the plurality of multiplexed sockets 211-219 can share a single physical port 250, and the applications 202 can use the different multiplexed sockets 211-219 for performing read and/or write operations.

Figure 3:
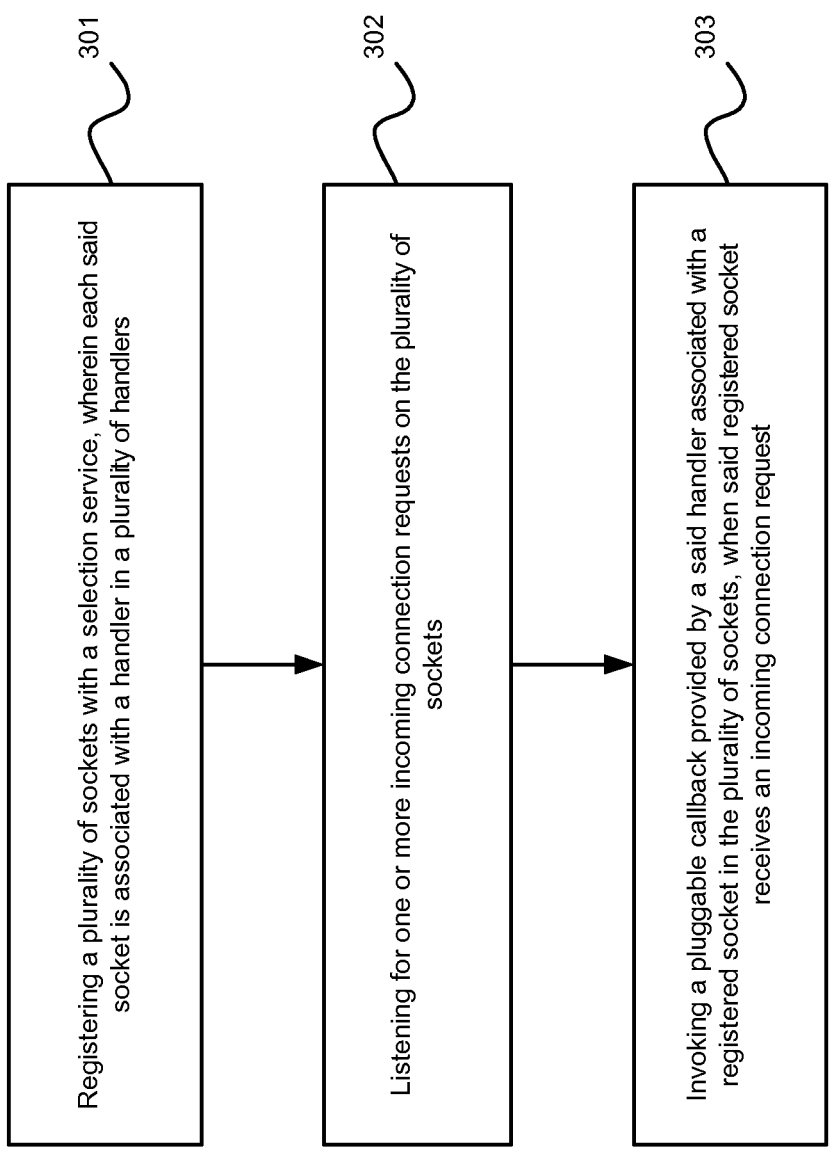
FIG. 3 illustrates an exemplary flow chart for providing selection services for socket programming in a server environment, in accordance with an embodiment of the invention.

FIG. 3 illustrates an exemplary flow chart for providing selection services for socket programming in a server environment, in accordance with an embodiment of the invention. As shown in FIG. 3, at step 301, a server environment can register a plurality of sockets with a selection service, wherein each said socket is associated with a handler in a plurality of handlers. Furthermore, at step 302, the selection service can listen for one or more incoming connection requests on the plurality of sockets. Then, at step 303, the selection service can invoke a pluggable callback provided by a said handler associated with a registered socket in the plurality of sockets, when said registered socket receives an incoming connection request.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:
1. A method for supporting socket programming in a middleware environment executing on one or more microprocessors, the method comprising:
configuring a distributed in-memory data grid comprising a cluster of nodes in the middleware environment to support asynchronized message processing, wherein each cluster node includes a message processing thread, and a service thread having an associated service queue, wherein the service thread is configured to preprocess an incoming message, generate a first continuation data structure representing a control state for processing the incoming message, and transmit the processing of the incoming message along with the continuation data structure to the message processing thread, and wherein the message processing thread generates a second continuation data structure based on the first continuation data structure, wraps the second continuation data structure in a return message, and sends the return message to the service queue associated with the service thread for further processing by the service thread;

providing, in the distributed in-memory data grid, a selection service that implements a plurality of abstract methods of an interface on the distributed in-memory data grid, wherein the selection service is associated with a single physical port configured to be multiplexed into a plurality of sub-ports, and includes a registration method and an invocation method;

registering a plurality of server socket channels with the selection service using the registration method thereof, wherein each socket channel is configured to bind one of a plurality of server sockets to one of the plurality of sub-ports;

registering a socket handler for each server socket with the selection service using the registration method thereof, wherein the socket handler provides a callback for use by the selection service to invoke that socket handler to process incoming network streams at the corresponding server socket;

listening, on one of the plurality of server sockets, for one or more connection requests directed to an application on the distributed in-memory data grid; and invoking, via the invocation method of the selection service, the callback provided by the socket handler corresponding to the server socket, to process the one or more connection requests.

2. The method according to claim 1, further comprising: utilizing one or more threads in a thread pool to handle the plurality of server sockets.

3. The method according to claim 2, wherein the number of threads used in the thread pool is determined by the distributed in-memory data grid.

4. The method according to claim 2, wherein each of the one or more applications implements application logic that is independent of the thread pool.

5. The method according to claim 1, wherein the plurality of server sockets share a single physical port.

6. The method according to claim 5, wherein the single physical port is multiplexed into multiple sub-ports.

7. The method according to claim 1, wherein each of the plurality of server sockets is registered with the selection service.

8. A system for supporting socket programming, comprising:

one or more computers, each including an application server in a middleware environment executing on one or more microprocessors;

a distributed in-memory data grid in a middleware environment executing on the one or more computers, wherein the distributed in-memory data grid comprises a cluster of nodes and is configured to support asynchronized message processing, wherein each cluster node includes a message processing thread, and a service thread having an associated service queue, wherein the service thread is configured to preprocess an incoming message, generate a first continuation data structure representing a control state for processing the incoming message, and transmit the processing of the incoming message along with the continuation data structure to the message processing thread, and wherein the message processing thread generates a second continuation data structure based on the first continuation data structure, wraps the second continuation data structure in a return message, and sends the return message to the service queue associated with the service thread for further processing by the service thread; and a selection service running on the distributed in-memory data grid, wherein the selection service implements a plurality of abstract methods of an interface on the distributed in-memory data grid, wherein the interface includes a registration method and an invocation method;

wherein the selection service is associated with a single physical port configured to be multiplexed into a plurality of sub-ports, and operates to register a plurality of server socket channels with the selection service using the registration method thereof, wherein each socket channel is configured to bind one of a plurality of server sockets to one of the plurality of sub-ports, register a socket handler for each server socket with the selection service using the registration method thereof, wherein the socket handler provides a callback for use by the selection service to invoke that socket handler to process incoming network streams at the corresponding server socket, listen, on one of the plurality of server sockets, for one or more connection requests directed to an application on the distributed in-memory data grid, and invoke, using the invocation method of the selection service, the callback provided by the socket handler corresponding to a server socket, to process the one or more connection requests.

9. The system according to claim 8, further comprising: one or more threads in a thread pool that operates to handle the plurality of server sockets.

10. The system according to claim 9, wherein the number of threads used in the thread pool is determined by the distributed in-memory data grid.

11. The system according to claim 9, wherein each of the one or more applications implements application logic that is independent of the thread pool.

12. The system according to claim 8, wherein the plurality of sockets share a single physical port.

13. The system according to claim 12, wherein the single physical port is multiplexed into multiple sub-ports.

14. The system according to claim 8, wherein each of the plurality of server sockets is registered with selection service.

15. A non-transitory computer-readable storage medium having instructions stored thereon for supporting socket programming in a middleware environment, said instructions, when executed by one or more microprocessors, cause the one or more microprocessors to perform the steps comprising:

configuring a distributed in-memory data grid comprising a cluster of nodes in the middleware environment to support asynchronized message processing,
  wherein each cluster node includes a message processing thread, and a service thread having an associated service queue,
  wherein the service thread is configured to preprocess an incoming message, generate a first continuation data structure representing a control state for processing the incoming message, and transmit the processing of the incoming message along with the continuation data structure to the message processing thread, and
  wherein the message processing thread generates a second continuation data structure based on the first continuation data structure, wraps the second continuation data structure in a return message, and sends the return message to the service queue associated with the service thread for further processing by the service thread;

providing, in the distributed in-memory data grid, a selection service that implements a plurality of abstract methods of an interface on the distributed in-memory data grid, wherein the selection service is associated with a single physical port configured to be multiplexed into a plurality of sub-ports, and includes a registration method and an invocation method;

registering a plurality of server socket channels with the selection service using the registration method thereof, wherein each socket channel is configured to bind one of a plurality of server sockets to one of the plurality of sub-ports;

registering a socket handler for each server socket with the selection service using the registration method thereof, wherein the socket handler provides a callback for use by the selection service to invoke that socket handler to process incoming network streams at the corresponding server socket;

listening, on one of the plurality of server sockets, for one or more connection requests directed to an application on the distributed in-memory data grid; and invoking, via the invocation method of the selection service, the callback provided by the socket handler corresponding to the server socket, to process the one or more connection requests.

16. The non-transitory computer-readable storage medium according to claim 15, further comprising:
  utilizing one or more threads in a thread pool to handle the plurality of server sockets.

17. The non-transitory computer-readable storage medium according to claim 16, wherein the number of threads used in the thread pool is determined by the distributed in-memory data grid.

18. The non-transitory computer-readable storage medium according to claim 16, wherein each of the one or more applications implements application logic that is independent of the thread pool.

19. The non-transitory computer-readable storage medium according to claim 15, wherein the plurality of server sockets share a single physical port.

20. The non-transitory computer-readable storage medium according to claim 19, wherein the single physical port is multiplexed into multiple sub-ports.

* * * * *

UNITED STATES PATENT AND TRADEMARK OFFICE
CERTIFICATE OF CORRECTION

PATENT NO. : 9,787,561 B2  
APPLICATION NO. : 13/671433  
DATED : October 10, 2017  
INVENTOR(S) : Falco et al.

Page 1 of 1

It is certified that error appears in the above-identified patent and that said Letters Patent is hereby corrected as shown below:

In the Specification

In Column 2, Line 61, delete "capability" and insert -- capability. --, therefor.

Signed and Sealed this  
Nineteenth Day of June, 2018

Andrei Iancu  
*Director of the United States Patent and Trademark Office*